United States Patent
Nakamura et al.

(10) Patent No.: US 10,831,021 B2
(45) Date of Patent: Nov. 10, 2020

(54) DISPLAY DEVICE AND INCLUDING A SCREEN CONCAVE MIRROR AND FLAT MIRROR

(71) Applicants: Kento Nakamura, Kanagawa (JP); Takehide Ohno, Kanagawa (JP); Hiromichi Atsuumi, Kanagawa (JP); Naoki Miyatake, Kanagawa (JP); Kazuhiro Fujita, Tokyo (JP); Yuki Hayashi, Osaka (JP)

(72) Inventors: Kento Nakamura, Kanagawa (JP); Takehide Ohno, Kanagawa (JP); Hiromichi Atsuumi, Kanagawa (JP); Naoki Miyatake, Kanagawa (JP); Kazuhiro Fujita, Tokyo (JP); Yuki Hayashi, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/886,401

(22) Filed: Feb. 1, 2018

(65) Prior Publication Data

US 2018/0252916 A1 Sep. 6, 2018

(30) Foreign Application Priority Data

Mar. 2, 2017 (JP) .................................. 2017-039256
Dec. 6, 2017 (JP) .................................. 2017-234180

(51) Int. Cl.
*G02B 27/01* (2006.01)

(52) U.S. Cl.
CPC ..... *G02B 27/0101* (2013.01); *G02B 27/0149* (2013.01); *G02B 2027/011* (2013.01);
(Continued)

(58) Field of Classification Search
CPC ........ B60K 2350/2052; G02B 27/0101; G02B 2027/011; G02B 2027/014;
(Continued)

(56) References Cited

U.S. PATENT DOCUMENTS 5,357,372 A * 10/1994 Chen .................. G02B 27/0101
359/630
5,734,506 A * 3/1998 Williams ........... G02B 27/0101
359/630
(Continued)

FOREIGN PATENT DOCUMENTS

FR 2 844 061 A1 3/2004
JP 2009-115908 5/2009
JP 2015-232692 12/2015

OTHER PUBLICATIONS

Extended European Search Report dated Jun. 27, 2018 in Patent Application No. 18153278.9, 7 pages.

*Primary Examiner* — Bao-Luan Q Le
(74) *Attorney, Agent, or Firm* — Oblon, McClelland, Maier & Neustadt, L.L.P.

(57) ABSTRACT

A display device includes a screen to form an intermediate image with light; a concave mirror, and a first mirror disposed between the screen and the concave mirror. The first mirror includes a first reflective area to reflect the light emitted from the screen to the concave mirror; a second reflective area to reflect the light emitted from the concave mirror to an area where a virtual image is formed; and a common reflective area in which the first reflective area and the second reflective area at least partly overlap on each other.

12 Claims, 6 Drawing Sheets

(52) U.S. Cl.
CPC .............. *G02B 2027/014* (2013.01); *G02B 2027/0181* (2013.01); *G02B 2027/0183* (2013.01)

(58) Field of Classification Search
CPC .... G02B 2027/0181; G02B 2027/0183; G02B 27/0149; G03B 21/28; G06K 9/00671
See application file for complete search history.

(56) References Cited

U.S. PATENT DOCUMENTS

| | | | |
|---|---|---|---|
| 9,134,536 B2 * | 9/2015 | Sekiya | G02B 27/0101 |
| 9,958,677 B2 * | 5/2018 | Kuzuhara | G02B 27/0101 |
| 10,048,496 B2 * | 8/2018 | Kawana | G02B 27/0101 |
| 2014/0152711 A1 * | 6/2014 | Sekiya | G02B 27/01 345/690 |
| 2014/0177022 A1 | 6/2014 | Saisho et al. | |
| 2015/0219803 A1 | 8/2015 | Inamoto et al. | |
| 2015/0277115 A1 | 10/2015 | Inamoto et al. | |
| 2015/0370069 A1 | 12/2015 | Saisho et al. | |
| 2016/0266383 A1 | 9/2016 | Liu | |
| 2016/0320615 A1 | 11/2016 | Nakamura et al. | |
| 2016/0334637 A1 | 11/2016 | Saisho et al. | |
| 2017/0154558 A1 | 6/2017 | Atsuumi et al. | |
| 2017/0184843 A1 * | 6/2017 | Kuzuhara | G02B 27/0101 |
| 2017/0212346 A1 * | 7/2017 | Kawana | G02B 27/0101 |
| 2017/0315353 A1 | 11/2017 | Saisho et al. | |

\* cited by examiner

DISPLAY DEVICE AND INCLUDING A SCREEN CONCAVE MIRROR AND FLAT MIRROR

CROSS-REFERENCE TO RELATED APPLICATION

This patent application is based on and claims priority pursuant to 35 U.S.C. § 119(a) to Japanese Patent Application No. 2017-039256, filed on Mar. 2, 2017 and Japanese Patent Application No. 2017-234180, filed on Dec. 6, 2017 in the Japan Patent Office, the entire disclosures of which are hereby incorporated by reference herein.

BACKGROUND

Technical Field

Embodiments of the present disclosure relate to a display device and an apparatus.

Background Art

A heads-up display (HUD) is used as an application that allows a driver (an observer) to recognize various kinds of information (for example, vehicle information, navigation information, and warning information) with reduced movement of line of sight in a mobile object such as a vehicle.

SUMMARY

In one aspect of this disclosure, there is provided an improved a display device including a screen to form an intermediate image with light; a concave mirror, and a first mirror disposed between the screen and the concave mirror. The first mirror includes a first reflective area to reflect the light emitted from the screen to the concave mirror; a second reflective area to reflect the light emitted from the concave mirror to an area where a virtual image is formed; and a common reflective area in which the first reflective area and the second reflective area at least partly overlap on each other.

In another aspect of this disclosure, there is provided an improved apparatus including the above-described display device and a transmission and reflection member to form a virtual image with the light forming the intermediate image.

BRIEF DESCRIPTION OF THE DRAWINGS

The aforementioned and other aspects, features, and advantages of the present disclosure will be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

The present disclosure is not limited to the following embodiments, and the constituent elements of the embodiments includes those which can be easily conceived by those skilled in the art, substantially the same ones, and those in the following embodiments include those which can be easily conceived by those skilled in the art, substantially the same, and within equivalent ranges. Furthermore, various omissions, substitutions, changes and combinations of constituent elements can be made without departing from the gist of the following embodiments.

A detailed description is given below of a display device 1 and an apparatus 1000 according to embodiments of the present disclosure, with referring to the figures. The present disclosure is not limited to the following embodiments, and the constituent elements of the embodiments includes those which can be easily conceived by those skilled in the art, substantially the same ones, and those in the following embodiments include those which can be easily conceived by those skilled in the art, substantially the same, and within equivalent ranges. Furthermore, various omissions, substitutions, changes and combinations of constituent elements can be made without departing from the gist of the following embodiments.

Figure 1:
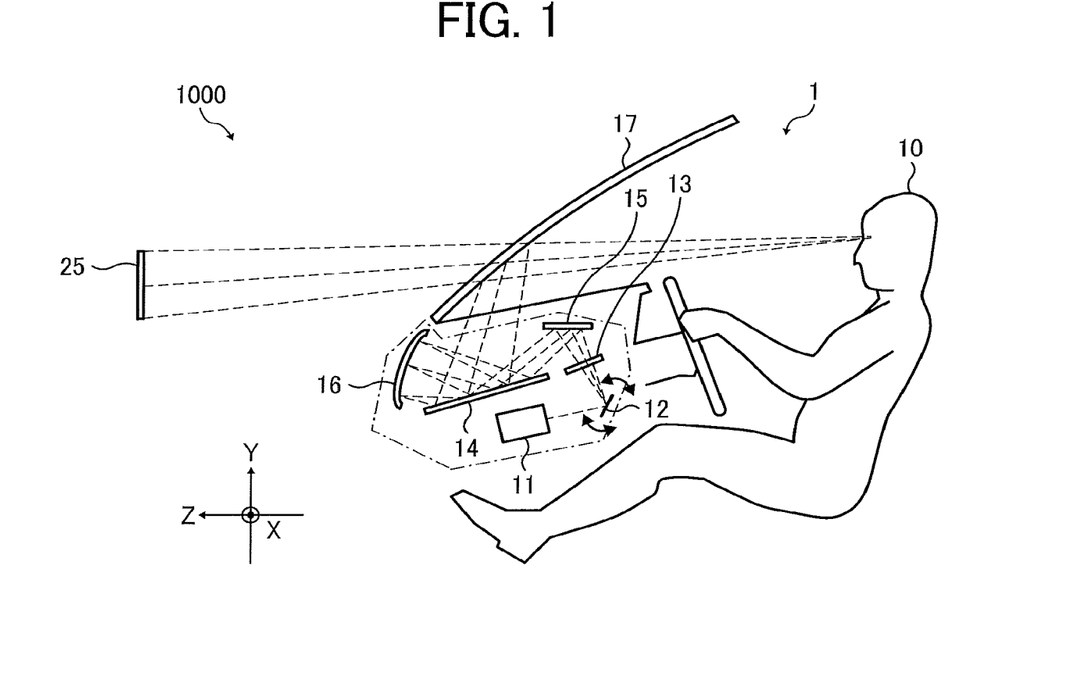
FIG. 1 is an illustration of a configuration of a display device according to an embodiment of the present disclosure.

FIG. 1 is an illustration of a configuration of the display device 1 according to an embodiment of the present disclosure. The display device 1 according to the present embodiment is a heads-up display (HUD) mounted on the apparatus 1000. Examples of the apparatus 1000 include a mobile object such as a vehicle, an aircraft, and a ship, and a non-mobile body such as a steering simulation system, or a home theater system. The following describes a HUD mounted on an automobile as an example of the display device 1.

The display device 1 includes a light source section 11, a scanning mirror 12, a screen 13, a first flat mirror 14 (a first mirror), a second flat mirror 15 (a second mirror), and a concave mirror 16.

The windshield 17 is a transmission and reflection member that allows some of light rays to transmit therethrough and reflects the remaining light rays (having partial reflection function). The windshield 17 serves as a semitransparent mirror that allows an observer (driver) 10 to visually recognize the real space in front and a virtual image 25 providing prescribed information to the observer 10. In some embodiments, the windshield 17 includes a curved surface. The virtual image 25 provides, for example, vehicle information (e.g., speed and travel distance), navigation information (e.g., route guidance and traffic information), and warning information (e.g., collision warning) to the observer 10. In some embodiments, the display device 1 displays the virtual image 25 to overlap the real space in front of the windshield 17. In some embodiments, a semitransparent mirror (combiner) is used as a separate transmission and reflection member having the same function (partial reflection function) as that of the windshield 17.

The light source section 11 emits laser light. In at least one embodiment, the light source section 11 emits laser light in which three laser beams of three colors, red R, green G, and blue B are combined. The laser light emitted from the light source section 11 is directed to the reflecting surface of the scanning mirror 12.

The scanning mirror 12 is a device that changes the traveling direction of laser light using, e.g., micro-electro-mechanical systems (MEMS). The scanning mirror 12 constitutes, for example, a mirror system that includes one micro-mirror that swings with respect to two orthogonal axes and two mirrors that swing with respect to or rotate about one axis.

The laser beam emitted from the scanning mirror 12 scans the screen 13 to form an intermediate image that is a two-dimensional image on the screen 13. The screen 13 that includes, for example, a microlens array is operable to diverge the laser beam at a predetermined divergence angle.

The second flat mirror 15 reflects light emitted from the screen 13 to the first flat mirror 14. In some embodiments, the light emitted from the screen 13 is directly directed to the first flat mirror 14 without using the second flat mirror 15. The second flat mirror 15 is disposed as appropriate according to design necessity. As illustrated in FIG. 1 for example, the second flat mirror 15 is disposed so that the light emitted from the screen 13 travels indirectly to the first flat mirror 14 in the case in which the light emitted from the screen 13 has difficulty in directly traveling to the first flat mirror 14 due to the restriction of the storage space of the display device 1.

The first flat mirror 14 reflects the light emitted from the screen 13 to the concave mirror 16. In the present embodiment, the "light emitted from the screen 13" refers to light that has been emitted from the screen 13 and reflected by the second flat mirror 15. However, no limitation is intended therein. In some embodiments, the "light emitted from the screen 13" is light that has been emitted from, e.g., the screen 13 and has directly traveled to the first flat mirror 14. In some other embodiments, the "light emitted from the screen 13" is light that has been emitted from the screen 13 and has passed through one or more optical members (including the second flat mirror 15) disposed in an optical path between the screen 13 and the first flat mirror, traveling to the first flat mirror 14. The first flat mirror 14 reflects the light emitted from the concave mirror 16 to the windshield 17. The light emitted from the screen 13 is reflected by a first reflective area, which is described later, on the first flat mirror 14. The light emitted from the concave mirror 16 is reflected by a second reflective area, which is described later, on the first flat mirror 14.

The concave mirror 16 reflects the light reflected from the first reflective area of the first flat mirror 14 to the second reflective area of the first flat mirror 14. The concave mirror 16 is designed and arranged to correct image distortion due to the curved shape of the windshield 17. The light emitted from the concave mirror 16 is reflected by the first flat mirror 14 to the windshield 17. As a result, the light constituting an intermediate image formed by the screen 13 is projected toward the windshield 17, which allows the observer 10 to visually recognize the virtual image 25 with the light reflected by the windshield 17.

In FIG. 1, an X axis indicates an axis in the lateral direction of the apparatus 1000 (the automobile in the present embodiment) mounted with the display device 1, and a Y axis indicates an axis in the vertical direction of the apparatus 1000. Further, a Z axis indicates an axis in the depth direction of the apparatus 1000.

Figure 2:
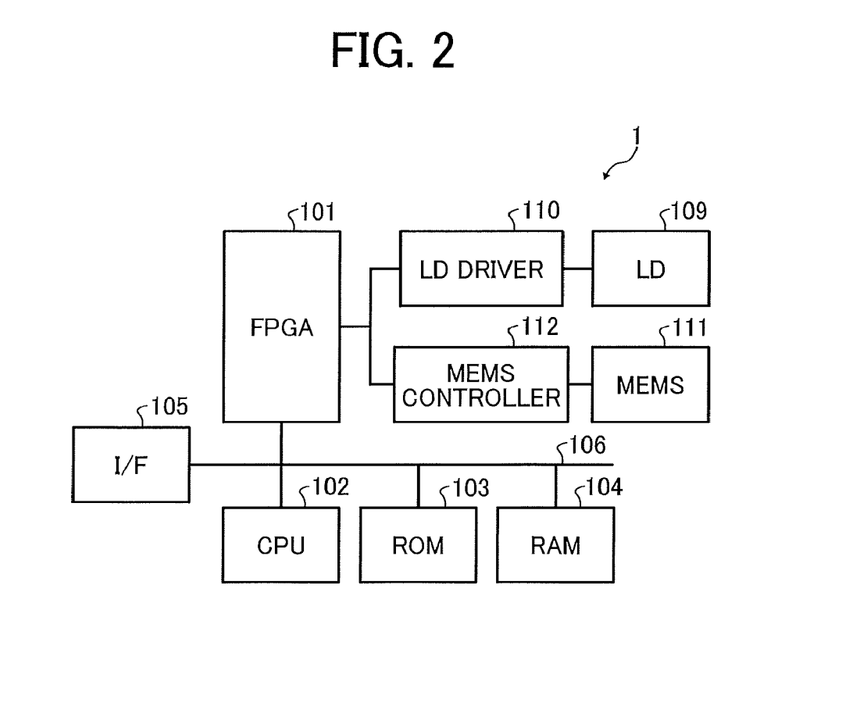
FIG. 2 is a block diagram of a hardware configuration of the display device of FIG. 1.

FIG. 2 is a block diagram of a hardware configuration of the display device of FIG. 1 according to an embodiment of the present disclosure. The display device 1 according to the present embodiment includes a field-programmable gate array (FPGA) 101, a central processing unit (CPU) 102, a read only memory (ROM) 103, a random access memory (RAM) 104, an interface (I/F) 105, a bus line 106, a laser diode (LD) 109, an LD driver 110, a MEMS 111, and a MEMS controller 112.

The LD 109 is a semiconductor light emitting element constituting a part of the light source section 11. The LD driver 110 is a circuit that generates a drive signal for driving the LD 109. The MEMS 111 constitutes a part of the scanning mirror 12 and displaces a mirror. The MEMS controller 112 is a circuit that generates a drive signal for driving the MEMS 111. The FPGA 101 is an integrated circuit that is changeable in setting by a designer of the display device 1. The LD driver 110 and the MEMS controller 112 generate a drive signal according to a control signal from the FPGA 101. The CPU 102 is an integrated circuit that performs processing for controlling the display apparatus 1 as a whole. The ROM 103 is a storage device that stores a program for controlling the CPU 102. The RAM 104 is a storage device that functions as a work area of the CPU 102. The I/F 105 is an interface for communicating with an external device, and is connected to, for example, a controller area network (CAN) of a car.

Figure 3:
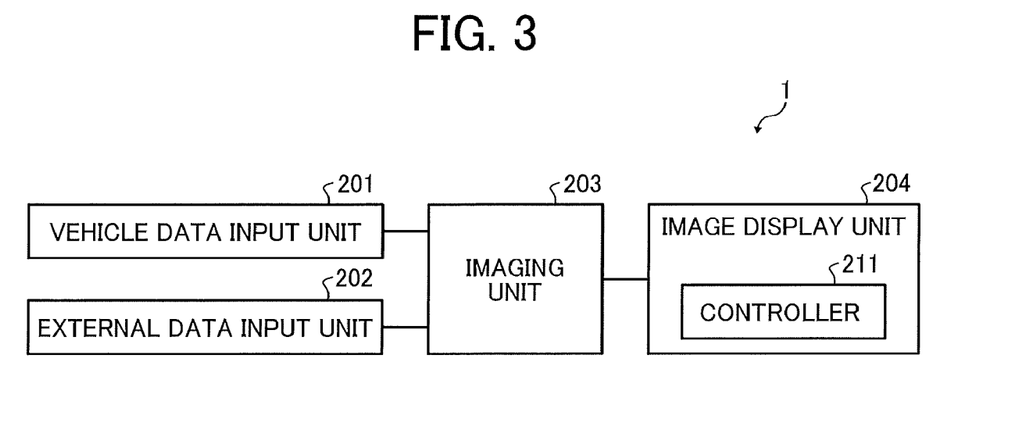
FIG. 3 is a block diagram of a functional configuration of the display device of FIG. 1.

FIG. 3 is a block diagram of a functional configuration of the display device 1 according to an embodiment of the present disclosure. The display device 1 according to the present disclosure includes a vehicle information input unit 201, an external information input unit 202, an image generator 203, and an image display unit 204. The vehicle information input unit 201 is a functional unit that obtains information (speed, traveling distance, and other information) of a car from, for example, the CAN. The vehicle information input unit 201 is implemented by, e.g., the I/F 105, the CPU 102, and a program stored in the ROM 103. The external information input unit 202 receives external information (for example, positional information from global positioning system (GPS), route information from a navigation system, and traffic information) of a car from external network. The external information input unit 202 is implemented by, e.g., the I/F 105, the CPU 102, and a program stored in the ROM 103. The image generator 203 is a function unit that determines a configuration of a virtual image 25 and generates display information for displaying the virtual image 25, based on the information obtained from the vehicle information input unit 201 and the external information input unit 202. The image generator 203 is implemented by, e.g., the I/F 105, the CPU 102, and a program stored in the ROM 103. The image display unit 204 is a functional unit that displays a virtual image 25 on a predetermined screen (the windshield 17 in the present embodiment) based on the display information generated by the image generator 203. The image display unit 204 is implemented by, for example, the CPU 102, the FPGA 101, the LD 109, the LD driver 110, the MEMS 111, and a MEMS controller 112. The image display unit 204 includes a controller 211 that is a functional unit that performs processing for adjusting, for example, the position and brightness of the virtual image 25. The controller 211 generates a signal for controlling, for example, the FPGA 101, the LD driver 110, and the MEMS controller 112.

Figure 4:
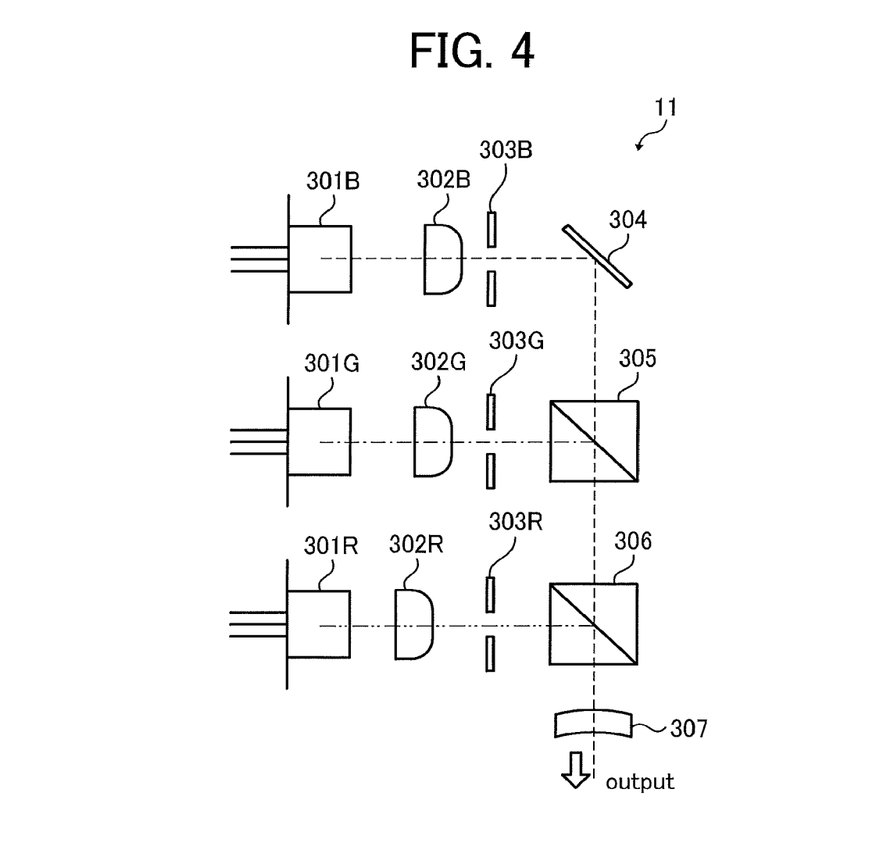
FIG. 4 is an illustration of a specific configuration of a light source section according to an embodiment of the present disclosure.

FIG. 4 is an illustration of a specific configuration of the light source section 11 according to at least one embodiment. The light source section 11 according to the present embodiment includes light source elements 301R, 301G, 301B, coupling lenses 302R, 302G, 302B, apertures 303R, 303G, 303B, combining elements 304, 305, 306, and a lens 307. The light source elements 301R, 301G, 301B of three colors (R, G, B) are LDs each having one or more light emitting points, and emits light beams having different wavelengths λR, λG, λB (for example, λR is 640 nanometers (nm), λG is 530 nm, λB is 445 nm). The emitted light beams are coupled by the coupling lenses 302R, 302G, and 302B, respectively. The coupled light beams are shaped by the apertures 303R, 303G, and 303B, respectively. Each of the apertures 303R, 303G, 303B has a shape (for example, a circle, an ellipse, a rectangle, or a square) according to prescribed conditions of, for example, the divergence angle of the light beam. The light beams shaped by the apertures 303R, 303G, 303B are combined by the three combining elements 304, 305, and 306, respectively. Each of the combining elements 304, 305, and 306 is a plate-like or prismatic dichroic mirror to reflect or transmit the corresponding light beam therethrough according to the wavelength of the light beam, and thus combine the light beams into one light beam that travels along one optical path. The combined light beam passes through the lens 307 and is directed to the scanning mirror 12.

Figure 5:
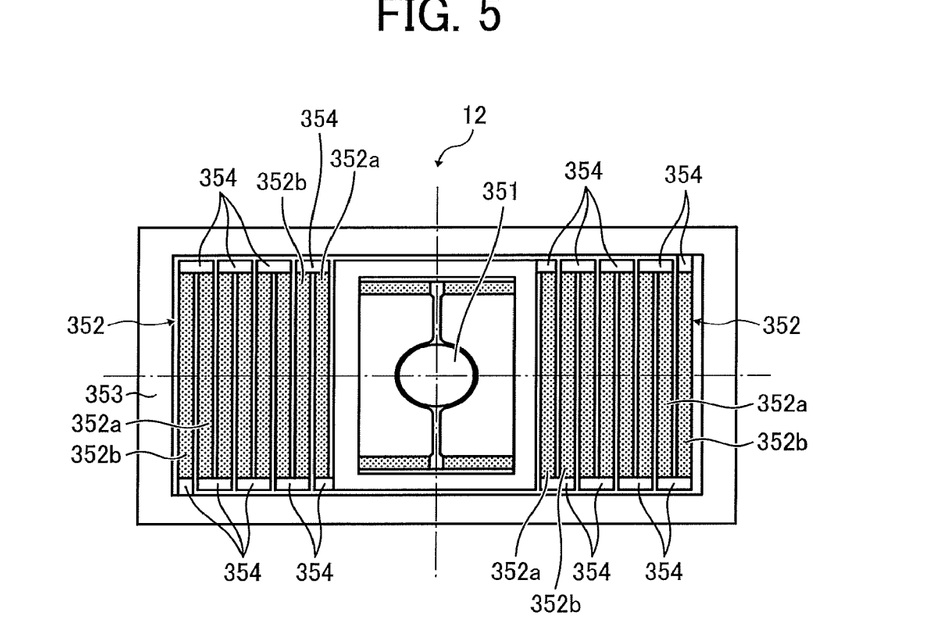
FIG. 5 is an illustration of a specific configuration of a scanning mirror according to an embodiment of the present disclosure.

FIG. 5 is an illustration of a specific configuration of the scanning mirror 12 according to an embodiment of the present disclosure. The scanning mirror 12 according to the present embodiment is a MEMS mirror manufactured by a semiconductor process and includes a mirror 351, a serpentine beam 352, a frame member 353, and a piezoelectric member 354. The mirror 351 has a reflecting surface that reflects a laser beam emitted from the light source section 11 toward the screen 13. A pair of serpentine beams 352 is formed with the mirror 351 interposed therebetween. The serpentine beam 352 includes a plurality of turning portions, each constituted by a first beam 352a and a second beam 352b that are alternately disposed in the serpentine beam 352. The serpentine beam 352 is supported by the frame member 353. The piezoelectric member 354 is disposed to connect the adjacent first beam 352a with the second beam 352b. The piezoelectric member 354 applies different voltages to the first beam 352a and the second beam 352b to warp each of the beams 352a and 352b. As a result, the adjacent beams 352a and 352b are bent in different directions. With an accumulation of bending force, the mirror 351 rotates in the vertical direction about the horizontal axis. This configuration allows an optical scanning in the vertical direction with a low voltage. An optical scanning in the horizontal direction, on the axis in the vertical direction, is performed with resonance using, for example, a torsion bar connected to the mirror 351.

Figure 6:
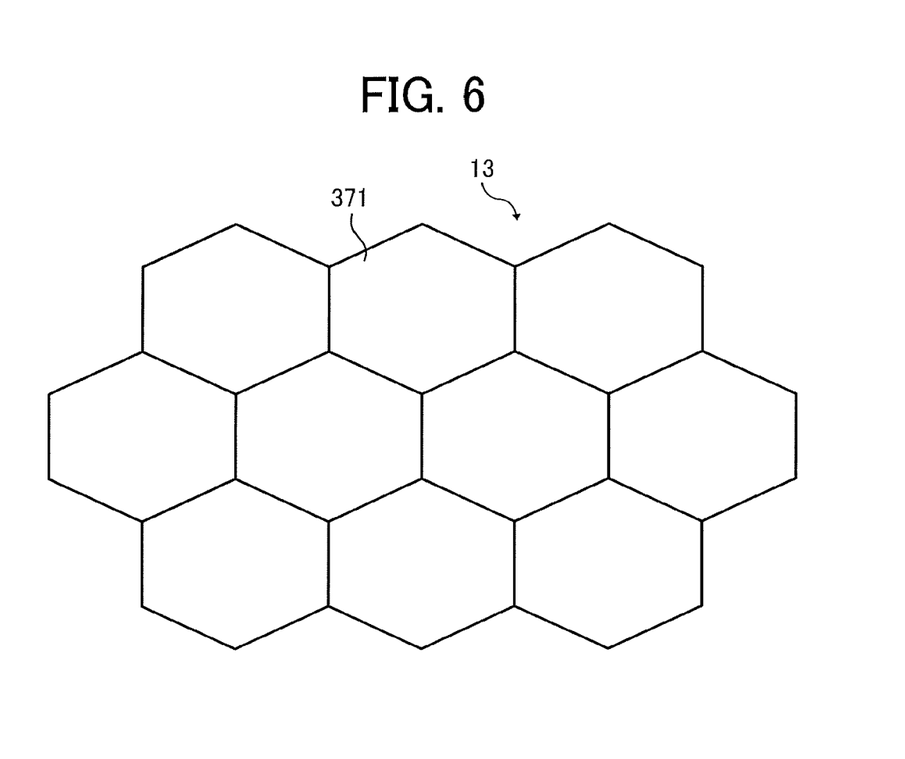
FIG. 6 is an illustration of a specific configuration of a screen according to an embodiment of the present disclosure.

FIG. 6 is an illustration of a specific configuration of the screen 13 according to an embodiment of the present disclosure. The screen 13 according to the present embodiment has a microlens-array structure in which a plurality of microlenses 371 is arranged without gap, each microlens having a hexagon shape. The screen 13 diverges the laser beam emitted from the scanning mirror 12 at a predetermined divergence angle. The width of each microlens 371 (the distance between two opposed sides) is approximately 200 micrometer (μm). Such a configuration that each microlens 371 has a hexagon shape allows the arrangement of the plurality of microlenses 371 with high density. Note that the shape of each microlens 371 is not limited to the hexagon shape. Thus, alternatively, in some embodiments, each microlens 371 has, for example, a rectangular shape, or a triangle shape. In the present embodiment, the configuration in which the plurality of microlenses 371 is regularly arranged is illustrated. However, no limitation is intended therein. In some embodiments, the center of each microlens 371 is decentered, and the plurality of microlenses 371 is irregularly arranged. When adopting such an eccentric arrangement, each microlens 371 has a different shape.

Such a configuration allows enlarging and projecting an intermediate image formed on the screen 13, onto the windshield 17, thus to display a virtual image 25 in the real space. At this time, the geometric shape of the display information in the virtual image 25 is adjusted to match the real space. This allows the observer 10 to perceive the display information to be superimposed on the real space.

Figure 7:
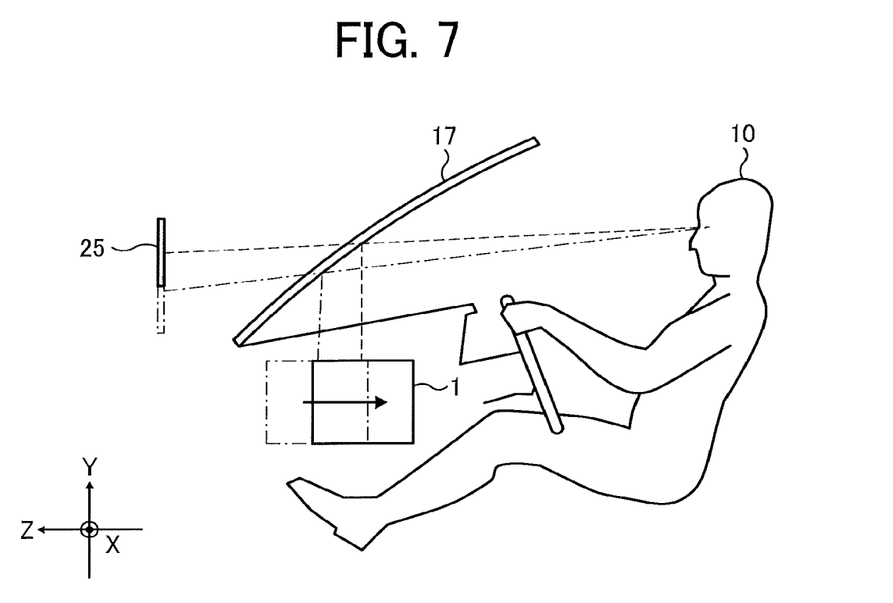
FIG. 7 is an illustration of an example in which a virtual image is overlapped in real space.

FIG. 7 is an illustration for explaining the difficulties in assembling when the virtual image 25 is superimposed on the real space. In FIG. 7, the solid line indicates the positions of the virtual image 25 and the display device 1 when the virtual image 25 is superimposed on the real space, and the dot-dash line indicates the positions of the virtual image 25 and the display device 1 when the virtual image 25 is not superimposed on the real space. When the virtual image 25 is not superimposed on the real space, the angle (depression angle) at which the observer 10 looks down at the virtual image 25 is increased. This allows setting the display device 1 at a position relatively far from the observer 10 in the Z-axis direction. In contrast, when the virtual image 25 is superimposed on the real space, the depression angle has to be reduced to have the virtual image 25 superimposed on the landscape far away from the observer 10 (display the virtual image 25 above). Accordingly, the display device 1 is to be set at a position relatively near the observer in the Z-axis direction. However, in many cases, it is difficult to install the display device 1 at a position close to the observer 10 due to restrictions on the structure of the apparatus 1000 on which the display device 1 is mounted. In a car for example, a meter mechanism, a pedal mechanism, an air conditioning mechanism, and a handle mechanism are disposed in an area on the side closer to the observer 10 in the dashboard. Accordingly, there is a limited space to install the display device 1 in this area. In view of such circumstances, there is a demand for downsizing of the display device 1, particularly in the Z-axis direction, so as to set the display device 1 near the observer 10.

Further, there are difficulties related to the disparity of the observer 10 to be overcome when superimposing the virtual image 25 on the real space. As described above, the display device 1 according to the present embodiment allows the observer 10 to perceive the display information in the virtual image 25 with the display information superimposed on the real space. However, in actuality, the observer 10 visually recognizes the display information near the windshield 17, which causes disparity between the display information and the observation target, on which the display information is superimposed, in the real space.

Figure 8:
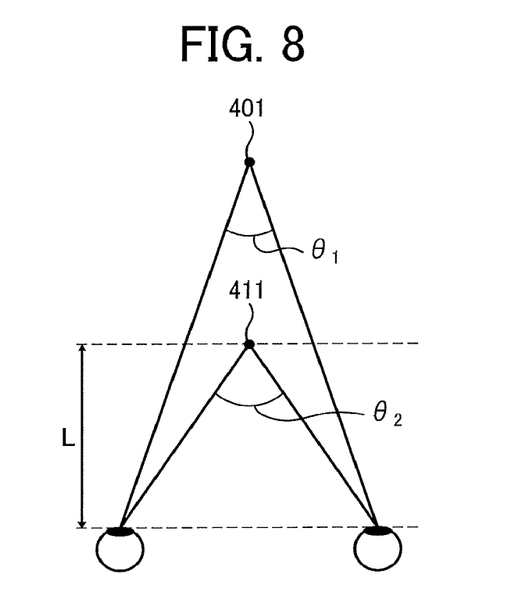
FIG. 8 is an illustration of a relation between a convergence angle corresponding to an image-forming position of an observation target and another convergence angle corresponding to an image-forming position of display information.

FIG. 8 is an illustration of a relation between a convergence angle θ1 corresponding to an image-forming position of an observation target 401 and a convergence angle θ2 corresponding to an image-forming position of display information 411. The convergence angle θ1 corresponding to the image-forming position of the observation target 401 in the real space refers to an angle formed by the lines of sight of both eyes of the observer 10 when the observer 10 visually observes the observation target 401. The convergence angle θ2 corresponding to the image-forming position of the display information 411 of the virtual image 25 refers to the lines of sight of both eyes of the observer 10 when the observer 10 visually observes the display information 411. The disparity angle θpara is defined as |θ2−θ1|, When the parallax angle θpara exceeds 1 degrees (deg), the observer 10 perceives a double image and thereby often feels uncomfortable or fatigued. Accordingly, in embodiments of the present disclosure, the display device 1 is designed to obtain the disparity angle θpara of 1 deg or less. For example, when the distance L from the viewpoint position to the image-forming position of the display information 411 is 3800 mm or more, and the distance from the viewpoint position to the observation target 401 is 2000 mm or more, the disparity angle θpara is 1 deg or less.

Figure 9:
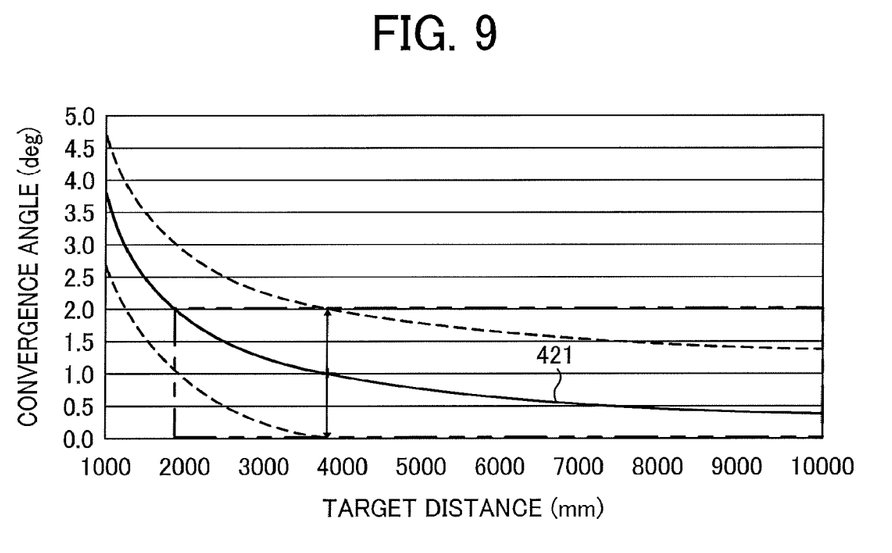
FIG. 9 is a graph of a relation between a distance from a viewpoint position to a target and a convergence angle.

FIG. 9 is a graph of a relation between the distance (the distance to the target) from the viewpoint position to a target (including the observation target 401 and the display information 411) and the convergence angle. As illustrated by a curve 421, the convergence angle changes with the distance from the viewpoint position of the observer to the target. As illustrated in FIG. 9, when the distance to the target (hereinafter, sometimes referred to as the target distance) is approximately 3800 mm, the convergence angle is approximately 1 deg. When the target distance (the distance from the viewpoint position to the imaging position of the observation target 401) falls within the range of the convergence angle of ±1 deg represented by the dotted chain line, the display information 411 is allowed to be displayed at any position in the real space that is viewable through the windshield 17 by the observer 10. Thus, when the distance L from the viewpoint position of the observer 10 to the image-forming position of the display information 411 is 3800 mm or more, the distance from the viewpoint position to the observation target 401 is 2000 mm or more, so as to satisfy the above-described conditions. In an actual use situation (for example, when the display device 1 is mounted on a mobile object such as a car), it is rare that the distance from the viewpoint position to the observation target 401 on which the display information 411 is desired to be superimposed is less than 2000 mm.

When the optical path length in the display device 1 is kept constant and the distance L is increased, the magnification of the optical system in the display device 1 increases. The optical path length is the length of the path of light that travels from the screen 13 on which the intermediate image is formed to the windshield 17 onto which the virtual image 25 is projected. The magnification of the optical system is the magnification with respect to the intermediate image of the virtual image 25. For example, the magnification is a value α obtained by dividing the length of the virtual image 25 in the vertical direction by the length of the intermediate image or the screen 13 in the vertical direction, or a value β obtained by dividing the length of the virtual image 25 in the horizontal direction by the length of the intermediate image or the screen 13 in the horizontal direction. As the magnification of the optical system increases, the sensitivity due to tolerance increases, which increases the demand for assembly accuracy of the display device 1. Therefore, as the magnification of the optical system increases, the deterioration of the virtual image 25 due to a change in the viewpoint position of the observer 10 increases. In general, when the distance L is set to 3800 mm or more, the magnification (both or one of α and β) of the optical system is greater than 15 magnification in many cases. With an increase in the optical path length, the magnification of the optical system is reduced to 15 magnification or less while maintaining the distance L of 3800 mm or greater. However, with an increase in the optical path length, the display device 1 disadvantageously increases in size. To handle such circumstances, the display device 1 according to the embodiments of the present disclosure includes a first flat mirror 14 to increase the optical path length without the up-sizing of the display device 1.

Figure 10:
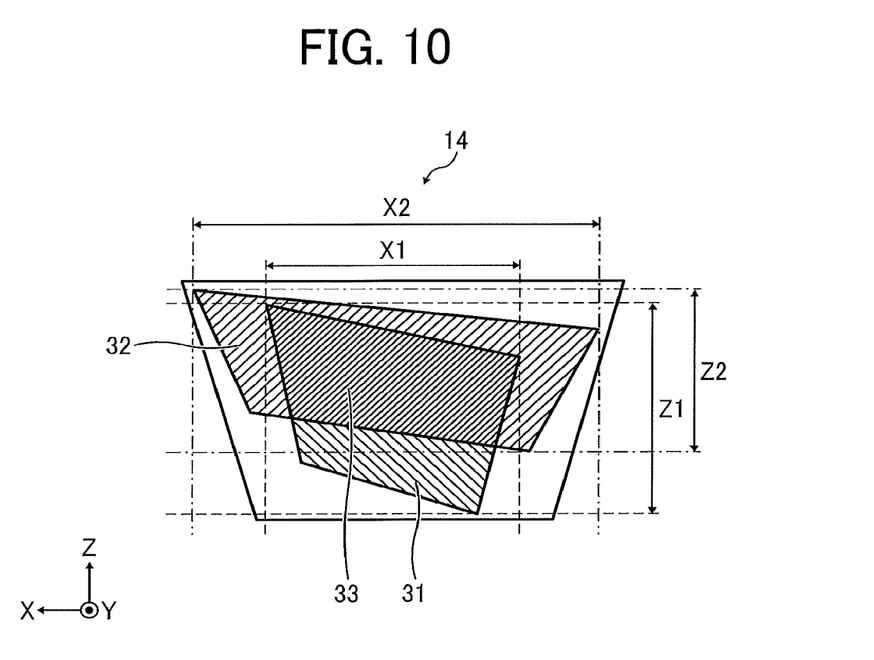
FIG. 10 is an illustration of a configuration of a first flat mirror according to an embodiment of the present disclosure.

FIG. 10 is an illustration of an example configuration of a first flat mirror 14 according to an embodiment of the present disclosure. The first flat mirror 14 has a first reflective area 31, a second reflective area 32, and a common reflective area 33. In FIG. 10, the Z axis indicates the depth direction of the apparatus 1000 (a car in the present embodiment), and the direction parallel to the reflection direction of the light. The X axis indicates the lateral (vertical) direction of the apparatus 1000, and the direction perpendicular to the reflection direction of light. The reflection direction of light refers to a direction (travel direction) in which light reflected by the first flat mirror 14 travels, that is, a travel direction in which light emitted from the second flat mirror 15 is reflected by the first flat mirror 14 and is directed to the concave mirror 16 or light emitted from the concave mirror 16 is reflected by the first flat mirror 14 and is directed to the windshield 17.

The first reflective area 31 is an area to reflect light emitted from the screen 13 to the concave mirror 16. In the present embodiment, the "light emitted from the screen 13" refers to light that has been emitted from the screen 13 and reflected by the second flat mirror 15. However, no limitation is intended therein. Thus, alternatively, in some embodiments, the light emitted from the screen 13 is directly delivered to the first flat mirror 14 without striking on the second flat mirror 15 (without the use of the second flat mirror 15). Further, in some other embodiments, a mirror other than the second flat mirror 15 is disposed in the optical path from the screen 13 to the first flat mirror 14, and light emitted from the screen 13 is reflected by the plurality of mirrors and is delivered to the first reflective area 31. The first reflective area 31 allows enlarging the virtual image 25 to a maximum size to be displayed.

The second reflective area 32 is an area to reflect the light emitted from the concave mirror 16 to the windshield 17. The second reflective area 32 allows enlarging the virtual image 25 to a maximum size to be displayed.

The common reflective area 33 is an area in which the first reflective area 31 overlaps with the second reflective area 32. The common reflective area 33 serves as an area (the first reflective area 31) to reflect the light emitted from the screen 13 to the concave mirror 16 and also as an area (the second reflective area 32) to reflect the light emitted from the concave mirror 16 to the windshield 17. As the ratio of the common reflective area 33 to the entire reflecting surface of the first flat mirror 14 increases, the first flat mirror 14 decreases in size.

With the above-described configuration that reflects light two times using the first flat mirror 14, the optical path length from the screen 13 that forms an intermediate image to the windshield 17 that displays the virtual image 25 advantageously increases. Further, with the configuration that includes the common reflective area 33, the first flat mirror 14 is advantageously downsized.

Figure 11:
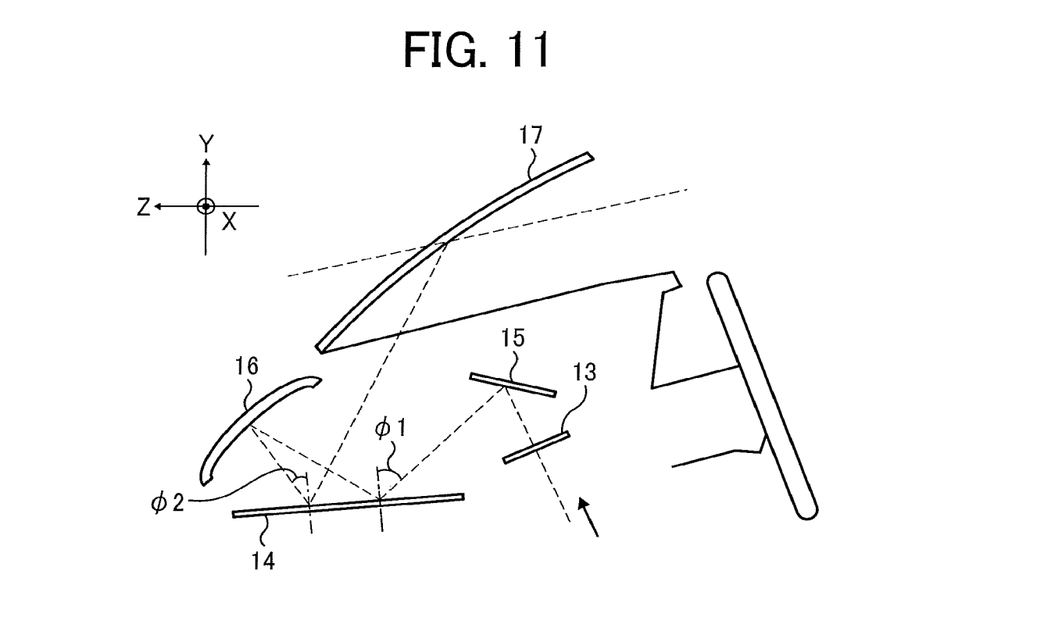
FIG. 11 is an illustration of an incident angle of light reflected from the first flat mirror according to an embodiment of the present disclosure.

FIG. 11 is an illustration of an example of incident angles $\varphi 1$ and $\varphi 2$ of light reflected by the first flat mirror 14 according to an embodiment of the present disclosure. In FIG. 11, the broken line indicates an optical path through which the central ray of the virtual image 25 propagates to the reference viewpoint of the observer 10. The light reflected by the second flat mirror 15 enters the first reflective area 31 on the first flat mirror 14 at the incident angle $\varphi 1$. In this case, the incident angle $\varphi 1$ is an incident angle obtained when observed from the YZ plane to the optical system (for example, the first flat mirror 14). Note that, the "light reflected by the second flat mirror 15" is an example of light emitted from the screen 13. Thus, alternatively, in some embodiments, the light emitted from the screen 13 is directly delivered to the first flat mirror 14, instead of the light emitted from the second flat mirror 15. Further, in some other embodiments, a mirror other than the second flat mirror 15 is disposed in the optical path from the screen 13 to the first flat mirror 14, and the light emitted from the screen 13 is reflected by the plurality of mirrors and is delivered to the first reflective area 31.

The light reflected by the concave mirror 16 enters the second reflective area 32 on the first flat mirror 14 at the incident angle $\varphi 2$. Same as the incident angle $\varphi 1$, the incident angle $\varphi 2$ is the incident angle obtained when observed from the YZ plane to the optical system.

The display device 1 according to the present embodiment is designed to satisfy the relation of $\varphi 1 > \varphi 2$. In many cases, the space to mount the display device 1 in the apparatus 1000 such as a car is limited according to the arrangement of various devices as described above. Accordingly, in some cases, it is difficult to dispose the second flat mirror 15 (light source section 11) and the concave mirror 16 on the same side with respect to the position of the first flat mirror 14 in the Z-axis direction. In such a case, the display device 1 is designed to satisfy the relation of $\varphi 1 > \varphi 2$, which allows the second flat mirror 15 (light source section 11) and the concave mirror 16 to be installed on different sides with respect to the first flat mirror 14, thus reducing the size of the display device 1.

Preferably, the incident angle $\varphi 1$ is approximately 1.6 times as great as the incident angle $\varphi 2$. This allows the second flat mirror 15 (light source section 11) and the concave mirror 16 to be disposed at desired positions, in the situation where various mechanisms as described above are arranged on the near side in the dashboard and the holding mechanism of the windshield 17 and parts inside the bonnet are present in the far side in the dashboard. Thus, the virtual image 25 increases in the size in the vertical direction as much as possible.

When the relation of $1.2 \times \varphi 2 \leq \varphi 1 \leq 2.0 \times \varphi 2$ is satisfied, the above-described advantage is substantially obtained. When $\varphi 1$ is less than $1.2 \times \varphi 2$, the lower area of the virtual image 25 is limited by an opening (an opening to guide the light emitted from the concave mirror 16 to the windshield 17) above the concave mirror 16 or the bonnet. When $\varphi 1$ is greater than $2.0 \times \varphi 2$, the upper area of the virtual image 25 is limited by an opening above the second flat mirror 15 (the light source section 11) or the bonnet. Thus, when the relation of $1.2 \times \varphi 2 \leq \varphi 1 \leq 2.0 \times \varphi 2$ is not satisfied, the virtual image 25 decreases in size and the quality of the display device 1 deteriorates.

Further, as illustrated in FIG. 10, when the diameter of the first reflective area 31 in the Z-axis direction (the direction parallel to the reflection direction of light) is Z1, the diameter of the first reflective area 31 in the X-axis direction (the direction perpendicular to the reflection direction of light) is X1, the diameter of the second reflective area 32 in the X-axis direction is Z2, and the diameter of the second reflective area 32 in the X-axis direction is X2, the relation of Z1>Z2 (Z1 is greater than Z2), or the relation of X1<X2 (X1 is less than X2) is satisfied. In the present embodiment, the relation of Z1>Z2 and the relation of X1<X2 are satisfied. The configuration that satisfies such relations allows the first reflective area 31 and the second reflective area 32 to overlap with each other, thereby forming the common reflective area 33.

Further, when Z1/X1 (the ratio of Z1 to X1) is A1 and Z2/X2 (the ratio of Z2 to X2) is A2, the relation of (A1/A2)<2 is preferably satisfied. In this case, A1 is a value indicating the degree of compression of the first reflective area 31 in the Z axis direction and A2 is a value indicating the degree of compression of the second reflective area in the Z axis direction. When the relation of (A1/A2)<2 is satisfied, the second reflective area 32 is more sufficiently compressed in the Z-axis direction than the first reflective area 31 does. With such a configuration, the incident angle $\varphi 2$ at which light emitted from the concave mirror 16 enters the second reflective area 32 is made smaller than the incident angle $\varphi 1$ at which light emitted from the second flat mirror 15 (the screen 13 when the second flat mirror 15 is not provided) enters the first reflective area 31. This configuration reduces the aberration of light emitted from the concave mirror 16, and increases the image quality of the virtual image 25.

Figure 12:
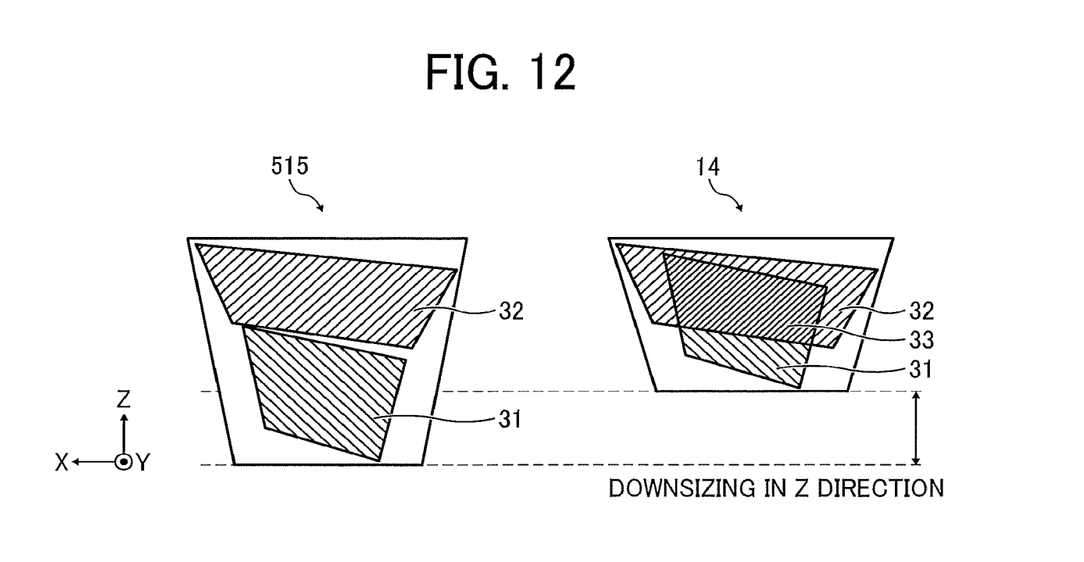
FIG. 12 is an illustration of an example in which the first flat mirror according to an embodiment of the present disclosure is compared with a first flat mirror according to a comparative example.

FIG. 12 is an illustration of an example in which the first flat mirror 14 according to an embodiment of the present disclosure (shown in right) is compared with a first flat mirror 515 according to a comparative example (shown in left). In the first flat mirror 515 according to the comparative example, there is no area where the first reflective area 31 and the second reflective area 32 overlap with each other. By contrast, the first flat mirror 14 according to the embodiments of the present disclosure has the common reflective area 33 in which the first reflective area 31 and the second reflective area 32 overlap with each other. With this configuration, the Z-axis directional length of the first flat mirror 14 according to the embodiments of the present disclosure is shorter than the first flat mirror 515 according to the comparative example does. The sizes and shapes of the first reflective area 31 and the second reflective area 32 according to the comparative example are the same as those of the first reflective area 31 and the second reflective area 32 according to the embodiments of the present disclosure. As described above, the configuration according to the embodiments of the present disclosure allows downsizing of the first flat mirror 14 and the display device 1 as a whole.

With the above-described configuration that reflects light two times using the first flat mirror 14, the optical path length from the screen 13 that forms an intermediate image to the windshield 17 that displays the virtual image 25 advantageously increases. Further, with the configuration that includes the common reflective area 33, the first flat mirror 14 is advantageously downsized. Hence, the embodiments of the present disclosure increase the image quality of the virtual image 25 without an increase in size of the display device 1.

Although the embodiments of the present disclosure have been described above, the embodiments have been presented as examples, and are not intended to limit the scope of the invention. Numerous additional modifications, variations, and combination are possible in light of the above teachings. It is therefore to be understood that within the scope of the appended claims, the embodiments and variations may be practiced otherwise than as specifically described herein. For example, elements and/or features of different illustrative embodiments may be combined with each other and/or substituted for each other within the scope of this disclosure and appended claims.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A display device, comprising:
a screen to form an intermediate image with light;
a flat mirror to reflect the light emitted from the screen;
a concave mirror; and
a first mirror disposed between the flat mirror and the concave mirror, the first mirror including:
a first reflective area to reflect the light reflected by the flat mirror to the concave mirror, the concave mirror reflecting light emitted from the first reflective area to a second reflective area of the first mirror;
the second reflective area to reflect light emitted from the concave mirror to an area where a virtual image is formed; and
a common reflective area in which the first reflective area and the second reflective area at least partly overlap on each other,
wherein the first mirror is flat,
wherein the flat mirror is disposed between the screen and the first mirror,
wherein the flat mirror and the concave mirror are installed on different sides with respect to the first mirror such that conditional expression (1) below is satisfied:

$$1.2 \times \varphi 2 \leq \varphi 1 \leq 2.0 \times \varphi 2 \quad (1), \text{where}$$

$\varphi 1$ is an incident angle of light that is emitted from the screen and enters the first reflective area; and $\varphi 2$ is an incident angle of light that is emitted from the concave mirror and enters the second reflective area,
wherein conditional expression (2) and conditional expression (3) are satisfied:

$$Z1 > Z2 \quad (2), \text{and}$$

$$X1 < X2 \quad (3), \text{where}$$

Z1 is a diameter of the first reflective area in a direction parallel to a reflection direction of the light that is reflected by the first mirror,
X1 is a diameter of the first reflective area in a direction perpendicular to the reflection direction,
Z2 is a diameter of the second reflective area in the direction parallel to the reflection direction, and
X2 is a diameter of the second reflective area in the direction perpendicular to the reflection direction, and
wherein conditional expression (4) below is satisfied:

$$(A1/A2) < 2 \quad (4), \text{where}$$

A1 is Z1/X1, and
A2 is Z2/X2.

2. The display device according to claim 1, wherein a virtual image formed with the light forming the intermediate image has a magnification of 15 or less relative to a magnification of the intermediate image.

3. The display device according to claim 1, wherein the screen includes a microlens array.

4. An apparatus, comprising:
the display device according to claim 1; and
a transmission and reflection member to form the virtual image with the light forming the intermediate image.

5. The apparatus according to claim 4, wherein the transmission and reflection member includes a curve surface.

6. A heads-up display device comprising the display device according to claim 1.

7. A display device, comprising:
a screen to form an intermediate image with light;
a flat mirror to reflect the light emitted from the screen;
a concave mirror; and
a first mirror disposed between the flat mirror and the concave mirror, the first mirror including:
a first reflective area to reflect the light reflected by the flat mirror to the concave mirror, the concave mirror reflecting light emitted from the first reflective area to a second reflective area of the first mirror; and
the second reflective area to reflect light emitted from the concave mirror to an area where a virtual image is formed,
wherein the first mirror is flat,
wherein the flat mirror is disposed between the screen and the first mirror,
wherein the flat mirror and the concave minor are installed on different sides with respect to the first mirror such that conditional expression (1) below is satisfied:

$$1.2 \times \varphi 2 \leq \varphi 1 \leq 2.0 \times \varphi 2 \quad (1), \text{where}$$

$\varphi 1$ is an incident angle of light that is emitted from the screen and enters the first reflective area; and
$\varphi 2$ is an incident angle of light that is emitted from the concave mirror and enters the second reflective area,
wherein conditional expression (2) and conditional expression (3) are satisfied:

$$Z1 > Z2 \quad (2), \text{and}$$

$$X1<X2 \qquad (3),$$ where

Z1 is a diameter of the first reflective area in a direction parallel to a reflection direction of the light that is reflected by the first mirror, X1 is a diameter of the first reflective area in a direction perpendicular to the reflection direction, Z2 is a diameter of the second reflective area in the direction parallel to the reflection direction, and X2 is a diameter of the second reflective area in the direction perpendicular to the reflection direction, and wherein conditional expression (4) below is satisfied:

$$(A1/A2)<2 \qquad (4),$$ where

A1 is Z1/X1, and
A2 is Z2/X2.

8. The display device according to claim 7, wherein a virtual image formed with the light forming the intermediate image has a magnification of 15 or less relative to a magnification of the intermediate image.

9. The display device according to claim 7, wherein the screen includes a microlens array.

10. An apparatus, comprising:

the display device according to claim 7; and a transmission and reflection member to form the virtual image with the light forming the intermediate image.

11. The apparatus according to claim 10, wherein the transmission and reflection member includes a curve surface.

12. A heads-up display device comprising the display device according to claim 7.

\* \* \* \* \*

UNITED STATES PATENT AND TRADEMARK OFFICE
CERTIFICATE OF CORRECTION

PATENT NO. : 10,831,021 B2
APPLICATION NO. : 15/886401
DATED : November 10, 2020
INVENTOR(S) : Kento Nakamura et al.

Page 1 of 1

It is certified that error appears in the above-identified patent and that said Letters Patent is hereby corrected as shown below:

On the Title Page

Item (54) and in the Specification, Column 1, Lines 1-3 the Title should read:
-- DISPLAY DEVICE INCLUDING A SCREEN, CONCAVE MIRROR AND FLAT MIRROR --

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*